US012352369B2

(12) United States Patent
Engstrand

(10) Patent No.: US 12,352,369 B2
(45) Date of Patent: Jul. 8, 2025

(54) STEAM INJECTION VALVE ACTUATOR, SYSTEM, AND METHOD

(71) Applicant: Phaedrus, LLC, Hartford, WI (US)

(72) Inventor: Bradley W. Engstrand, Hartford, WI (US)

(73) Assignee: PHAEDRUS, LLC, Hartford, WI (US)

( * ) Notice: Subject to any disclaimer, the term of this patent is extended or adjusted under 35 U.S.C. 154(b) by 0 days.

(21) Appl. No.: 17/236,970

(22) Filed: Apr. 21, 2021

(65) Prior Publication Data

US 2021/0324968 A1    Oct. 21, 2021

Related U.S. Application Data

(60) Provisional application No. 63/013,312, filed on Apr. 21, 2020.

(51) Int. Cl.
*F16K 37/00*    (2006.01)
*F17D 3/12*    (2006.01)

(52) U.S. Cl.
CPC ............ *F16K 37/0058* (2013.01); *F17D 3/12* (2013.01)

(58) Field of Classification Search
CPC ...... G01D 5/28; G01D 5/341; F15B 15/1438; F15B 15/1433; F15B 15/202;
(Continued)

(56) References Cited

U.S. PATENT DOCUMENTS 3,933,338 A * 1/1976 Herd .................. F16K 31/1225
251/63.6
6,145,810 A * 11/2000 Connolly ............. F16K 41/103
251/335.2
(Continued)

FOREIGN PATENT DOCUMENTS

DE    0185334 A2 *    6/1986
DE    19625775 A1    1/1998

OTHER PUBLICATIONS

International Search Report and Written Opinion cited in corresponding PCT App No. PCT/US21/28484; Sep. 10, 2021; 11 pp.

*Primary Examiner* — Angelisa L. Hicks
(74) *Attorney, Agent, or Firm* — Lempia Summerfield Katz LLC

(57) ABSTRACT

A valve actuator system includes a valve actuator assembly having a body defining an interior cavity and a piston coupled to a piston rod and movable within a piston cylinder provided within the interior cavity. The piston cylinder has a first chamber on a first side of the piston and a second chamber on a second rod side of the piston. One or more electronic components are disposed within the interior cavity and include at least one processor. The one or more electronic components are configured to move the piston via controlled air pressure and to continuously monitor and/or determine a position of the piston rod relative to the piston cylinder. A fail-safe reservoir is coupled to a source of air and is connected to both the first chamber and the second chamber to provide operating air thereto. A controller is configured to communicate with the processor of the one or more electronic components remote from the body and to selectively monitor and control functions of the valve actuator systems from the controller. The first chamber is maintained at a substantially constant pressure and the second chamber is varied in pressure to move and/or to hold the position of the piston to place the piston rod at a desired position relative to the piston cylinder.

17 Claims, 8 Drawing Sheets

(58) Field of Classification Search
CPC .............. F15B 15/2892; F15B 15/2853; F15B 15/2861; F15B 21/085; F15B 15/1466; F15B 15/2815
See application file for complete search history.

(56) References Cited

U.S. PATENT DOCUMENTS

| | | | |
|---|---|---|---|
| 6,361,025 B1 * | 3/2002 | Cincotta | B01F 25/313 261/DIG. 78 |
| 6,484,620 B2 * | 11/2002 | Arshad | G01S 17/10 91/1 |
| 6,702,985 B1 * | 3/2004 | Taggart | B67C 7/0073 422/302 |
| 7,388,188 B2 * | 6/2008 | Engstrand | G01V 8/20 250/221 |
| 8,973,890 B2 * | 3/2015 | Schrobenhausen | F15B 9/12 251/30.01 |
| 9,807,892 B2 * | 10/2017 | Grödl | F16K 31/04 |
| 9,909,601 B2 * | 3/2018 | Heerdt | F15B 15/2861 |
| 2003/0047065 A1 | 3/2003 | Stoll et al. | |
| 2007/0075226 A1 | 4/2007 | Engstrand | |
| 2008/0060509 A1 | 3/2008 | Beuth et al. | |
| 2016/0167473 A1 | 6/2016 | Coombs et al. | |

* cited by examiner

STEAM INJECTION VALVE ACTUATOR, SYSTEM, AND METHOD

RELATED APPLICATION DATA

This patent is entitled to the benefit of and claims priority to U.S. Provisional Application Ser. No. 63/013,312 filed Apr. 21, 2020 and entitled "Steam Injection Valve Actuator, System, and Method." The entire contents of this prior filed application are hereby incorporated herein by reference.

BACKGROUND

1. Field of the Disclosure

The present disclosure is generally directed to injecting steam into a pipeline of manufactured products, and more particularly to a valve actuator, system, and method for precisely controlling injection of steam into such a pipeline.

2. Description of Related Art

It is well known in process industries, such as the petrochemical, pharmaceutical, and food industries, for the processed materials to be passed along a pipe or pipeline during manufacture. The processed materials are typically in a liquid or slurry form during processing but often carry solid content as well. Also, the viscosity of the materials can vary widely from one material or process to another. It is also well known to inject steam into such pipes at a desired temperature, pressure, and/or flowrate for a variety of different purposes. In some examples, such processed materials include, but are certainly not limited to, grain, oil, soup, SPAM®, and the like. Steam injection may be done to help move the processed material along the pipe. Steam injection may also be done to control or raise the temperature of the processed material within the pipe. Steam injection may also be done to improve the process or affect the processed material in other ways.

For steam injection, a variable steam valve having an injection nozzle, and controlled by a mechanical diaphragm actuator, is used to meter the flow of steam at the point of injection into the pipe and in contact with the processed material. A large pressure drop from full steam pressure to the processed material pressure achieves a high velocity, choked steam flow, and instantaneous mixing of the flow of steam and the stream of processed material. The steam valve operation, however, is only as good as the operation capabilities of the mechanical diaphragm actuator.

FIG. 1 shows a basic generic view of such a system 10. A steam control valve 12 is deployed on a steam supply line 14 coupled to a steam source or supply 15. The steam control valve 12 is used to vary the pressure of the steam S at the point of injection into a pipe 16 and a flow of processed material within the pipe. Varying the pressure changes the steam density and velocity through the nozzle of the steam control valve 12 and can control the amount of heating. Regulating steam pressure to control heating can result in unstable operation, hammering, and vibration when high or low steam flowrates are required for a given process. At a low steam flowrate, such as trim heating, the differential between the steam pressure and the processed material pressure can be small. Thus, a slight fluctuation in pressure of either the steam or the processed material flow can cause an upset within the pipe. Alternatively, at a high steam flowrate, such as max heating at startup, the steam flow nozzle size of the steam control valve 12 may allow more steam than can be condensed, which may cause steam hammering to occur.

In a conventional system, a mechanical diaphragm actuator 18 is utilized to operate or control the steam injection valve 12. Such diaphragm actuators have been known and used for nearly 100 years for the steam injection process with little or no design changes or improvements. The typical diaphragm actuator includes a diaphragm positioned between two pneumatic chambers, a linear actuator movable via the diaphragm, and a spring that biases the diaphragm in one direction. The bias is created by spring force against an air column to stiffen the air and make it more controllable. Unfortunately, this causes a change in applied force as the spring is compressed. Typically, at full stroke, the air column is basically equal to the spring force and thus provides little additional applied force to control the forces created by the steam within the steam injection valve 12. The rudimentary design of the mechanical diaphragm actuator 18 limits the capability of the actuator and thus the operation of the steam injection valve.

In the injection process, the typical diaphragm actuator may be able to control the steam injection valve to a degree resulting in temperature fluctuation within a range of three to four degrees Fahrenheit (3-4° F.). The capabilities of the typical diaphragm actuator also can result in it taking 45 seconds or longer to reach a desired temperature. Further, diaphragm actuators do not meet strict 3A clean room standards, which are required for many of today's process industries. As a result, the pipeline of some systems must be routed to a separate room that contains the steam valves and the diaphragm actuators. The clean room environment may then be cleaned, i.e., pressure washed, as needed, while the separate room with the valves and actuators cannot be cleaned to the same standards without damaging the diaphragm actuators.

The above information described in this background section is provided to assist in understanding the background of the inventive concept. The background section may thus include one or more technical concepts, which are not considered as prior art that is already known to those having ordinary skill in the art.

SUMMARY

In one example, according to the teachings of the present disclosure, a valve actuator assembly includes a body defining a sealed exterior and an interior cavity and a piston coupled to a piston rod and movable within a piston cylinder provided within the interior cavity of the body. A first QVLA® emitter is associated with a first piston chamber within the piston cylinder. A first QVLA® sensor is positioned to sense illumination generated by the first QVLA® emitter. One or more electronic components are disposed within the interior cavity and include at least one a processor. The one or more electronic components are configured to move the piston via controlled air pressure and to continuously monitor and/or determine a position of the piston rod relative to the piston cylinder according to signals generated by the first QVLA® sensor. The first QVLA® sensor is coupled to the first QVLA® emitter via fiber optics.

In one example, the interior cavity can be maintained at a positive pressure.

In one example, the interior cavity can be maintained as a positive pressure of about 1-2 psi above the pressure that is adjacent the sealed exterior of the body.

In one example, a fail-safe reservoir can be connected to the first and second piston chambers. The fail-safe reservoir can be configured to have a pressure higher than an operating pressure of either of the first and second piston chambers.

In one example, a fail-safe reservoir can provide operating air to the first and second piston chambers and can receive the operating air from a source of air.

In one example, a fail-safe reservoir can be provided within the interior cavity of the body.

In one example, a fail-safe reservoir can be provided within the interior cavity and surrounding the piston cylinder.

In one example, the body can be stainless steel.

In one example, the body can be formed having a removable section that can be removed from a second section that carries, and to expose, the piston cylinder and the electronic components.

In one example, the body can have a removable section and a second section that can be removably joined to one another along a sealed joint. The body, when assembled, can be configured to meet 3A standards for clean room type environments.

In one example, according to the teachings of the present disclosure, a valve actuator system includes a valve actuator assembly having a body defining an interior cavity and a piston coupled to a piston rod and movable within a piston cylinder provided within the interior cavity. The piston cylinder has a first chamber on a first side of the piston and a second chamber on a second rod side of the piston. One or more electronic components are disposed within the interior cavity and include at least one processor. The one or more electronic components are configured to move the piston via controlled air pressure and to continuously monitor and/or determine a position of the piston rod relative to the piston cylinder. A fail-safe reservoir is coupled to a source of air and is connected to both the first chamber and the second chamber to provide operating air thereto. A controller is configured to communicate with the processor of the one or more electronic components and is remote from the body. The first chamber is maintained at a constant pressure within the constraints of the system. The second chamber is varied in pressure to move and/or to hold the position of the piston to place the piston rod at a desired position relative to the piston cylinder.

In one example, the valve actuator system can include a first QVLA® emitter associated with the first chamber within the piston cylinder and a first QVLA® sensor positioned to sense illumination generated by the first QVLA® sensor. The first QVLA® sensor can be coupled with the first QVLA® emitter via fiber optics.

In one example, the one or more electronic components can be configured to move the piston and to continuously monitor and/or determine the position of the piston rod relative to the piston cylinder according to signals generated by the first QVLA® sensor.

In one example, the valve actuator system can include a steam control valve coupled to a source of steam. The piston rod can be coupled to the steam control valve whereby movement of the piston rod can operate the steam control valve.

In one example, a steam supply line can be provided downstream of the steam control valve and be coupled to a pipe that carries a flow of manufactured product, thereby injecting steam into the flow.

In one example, the controller can be a smart phone or tablet that can communicate wirelessly with the one or more electronic components.

In one example, the controller can include a computer and a display, and the controller can communicate with the one or more electronic components.

In one example, according to the teachings of the present disclosure, a method of controlling a steam control valve of an industrial process is disclosed. The industrial process includes a valve actuator assembly having a body defining an interior cavity and a piston coupled to a piston rod and movable within a piston cylinder provided within the interior cavity. The piston cylinder has a first chamber on a first side of the piston and a second chamber on a second rod side of the piston and the piston rod is coupled to an actuator of the steam control valve. The method includes moving the piston, via one or more electronic components within the interior cavity, through controlled air pressure, the one or more electronic components including at least one processor configured to control the air pressure. The method also includes continuously monitoring and/or determining, via the one or more electronic components, a position of the piston rod relative to the piston cylinder to control operation of the steam control valve. The method further includes selectively monitoring and/or controlling, via a controller disposed remote from the valve actuator assembly and configured to communicate with the processor of the one or more electronic components, functions of the valve actuator system. The method also includes providing operating air from an external source of air to both the first chamber and the second chamber via a fail-safe reservoir disposed within the interior cavity of the body.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present disclosure should become apparent upon reading the following description in conjunction with the drawing figures, in which.

The use of the same reference numbers or characters throughout the description and drawings indicates similar or identical components, aspects, and features of the disclosure.

DETAILED DESCRIPTION OF THE DISCLOSURE

Figure 1:
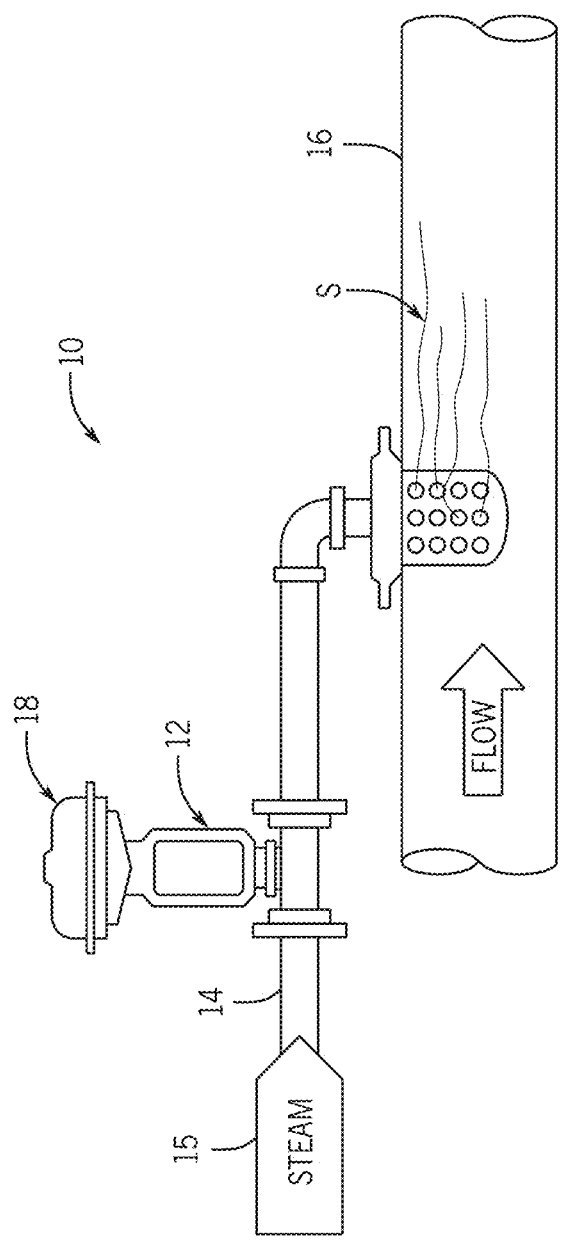
FIG. 1 shows a simplified schematic of one example of a known steam injection system and industrial process utilizing a prior art steam injection valve actuator.

Hereinafter, embodiments of the present disclosure are described in detail with reference to the accompanying drawings. In the drawings, the same reference numerals or characters are used throughout to designate the same or equivalent elements of the disclosure. In addition, a detailed description of well-known elements, aspects, components, techniques, methods, systems, and the like associated with the present disclosure have been omitted in order not to unnecessarily obscure the gist of the present disclosure.

Terms such as first, second, A, B, (a), (b), and the like may be used herein to describe elements in embodiments of the present disclosure. These terms are only used to distinguish one element from another element. The intrinsic features, sequence or order, and the like of the corresponding elements are not limited by the use of these terms. Unless otherwise defined, all terms used herein, including technical or scientific terms, have the same meanings as those generally understood by those having ordinary skill in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present disclosure.

Specific structural and functional descriptions of the embodiments put forth in the present disclosure are illustrated only for the purpose of describing the embodiments according to the present disclosure. The embodiments according to the present disclosure may be embodied in various forms. The present disclosure should not be construed as being limited to only the specific form of the embodiments described herein. Since the embodiments according to the present disclosure may be variously changed and have various forms, specific embodiments are illustrated in the drawings and described in detail in the present specification or application. The embodiments and examples should be understood to include all changes, equivalents, and substitutes included in the spirit and scope of the present disclosure. Each embodiment herein is disclosed as including a specific set, number, grouping, arrangement, and/or the like of various aspects of the present disclosure. The present disclosure and claims are not intended to so limited, but instead may encompass embodiments that include different sets, numbers, groupings, and arrangements of the various aspects of the disclosure, which may be presently claimed or not presently claimed.

Various components, i.e., devices, units, elements, and the like of the present disclosure may be described herein as having a specific purpose or performing a function, step, set of instructions, process, or the like. Such components may be construed to be "configured to" achieve or meet the specific purpose or to perform the function, step, set of instructions, or process.

The steam injection valve actuator, system, and method disclosed and described herein solve or improve upon one or more of the above noted and/or other problems and disadvantages with prior known actuators, systems, and methods. In one example, the disclosed valve actuator assembly, system, and method can more accurately control the applied force of the actuator and nearly instantaneously adjust to accommodate steam pressure changes by eliminating the need for the prior known compression spring. In one example, the disclosed valve actuator assembly, system, and method can control the steam injection valve more precisely resulting in temperature fluctuation within a much smaller range compared to the known diaphragm actuators. In one example, the valve actuator assembly, system, and method can control the steam injection valve to a degree that results in taking much less time to reach a desired temperature compared to the known diaphragm actuators. In one example, the disclosed valve actuator assembly, system, and method are configured to meet strict 3A clean room standards, which are required for many of today's process industries. Thus, the pipeline of industrial processes need not be routed to a separate room and can instead remain within a clean room environment and be cleaned, i.e., pressure washed, as needed. These and other objects, features, and advantages of the disclosure will become apparent to those having ordinary skill in the art upon reading this disclosure.

Figure 2:
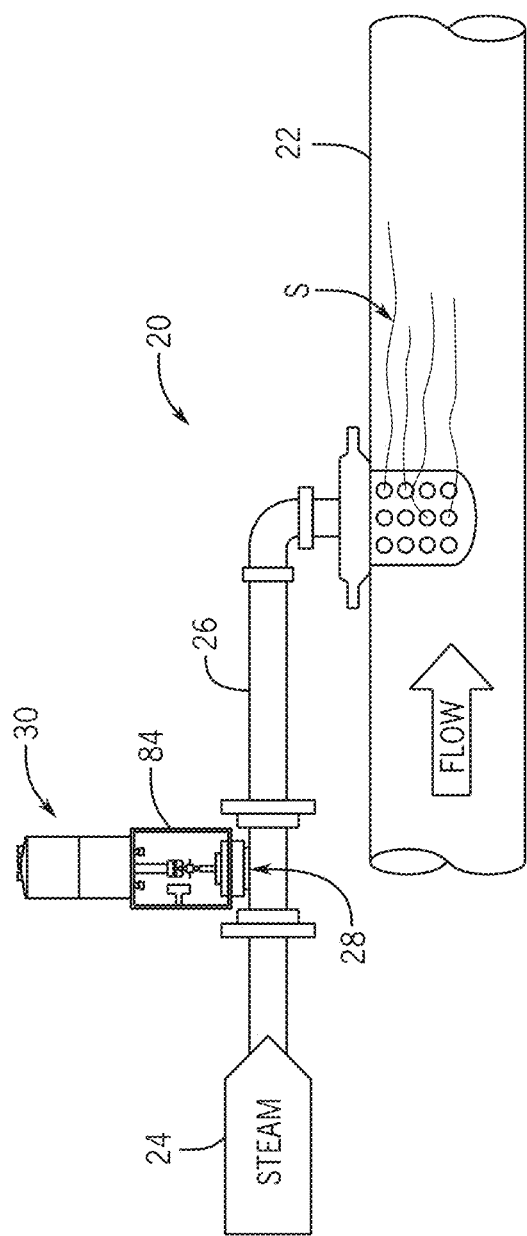
FIG. 2 shows a steam injection system and industrial process utilizing a steam injection valve actuator assembly in accordance with the teachings of the present disclosure.

Turning now to the drawings, the present disclosure is directed to a valve actuator assembly, a system, and a method that are intended to replace the conventional diaphragm actuators used to control steam injection valves that are commonly used in many process industries. FIG. 2 shows such a system 20 with a pipe 22 that includes a flow of processed material in a flow direction indicated by the FLOW arrow. The pipe 22 can range in size (diameter), such as between one (1) inch and ten (10) inches or more, depending on the type, volume, and the like of the material to be processed. The type of processed material can also vary widely, as noted above. The system 20 includes a steam source 24 coupled to a steam supply line 26 that is metered by a steam control valve 28. The steam source line 24 is connected to the pipe 22 and injects steam S into the processed material flowing through the pipe. In the prior art, the diaphragm actuator 18 (FIG. 1) controls operation of the steam control valve. According the teachings of the present disclosure, the diaphragm actuator is replaced by a valve actuator assembly, i.e., hereinafter an actuator 30, which is embodied in the disclosed system 20 and utilized according to the disclosed method.

As noted above, the disclosed actuator 30, system 20, and method can more precisely control operation of the steam control valve 28. The disclosed actuator 30, system 20, and method can also more precisely control the temperature of the steam S injected into the processed material. The disclosed actuator 30 and system 20 are also significantly more durable than the conventional diaphragm actuator since no diaphragm is used. The disclosed actuator 30 and system 20 are also significantly more precise since no compression spring is utilized in the actuator.

Figure 3:
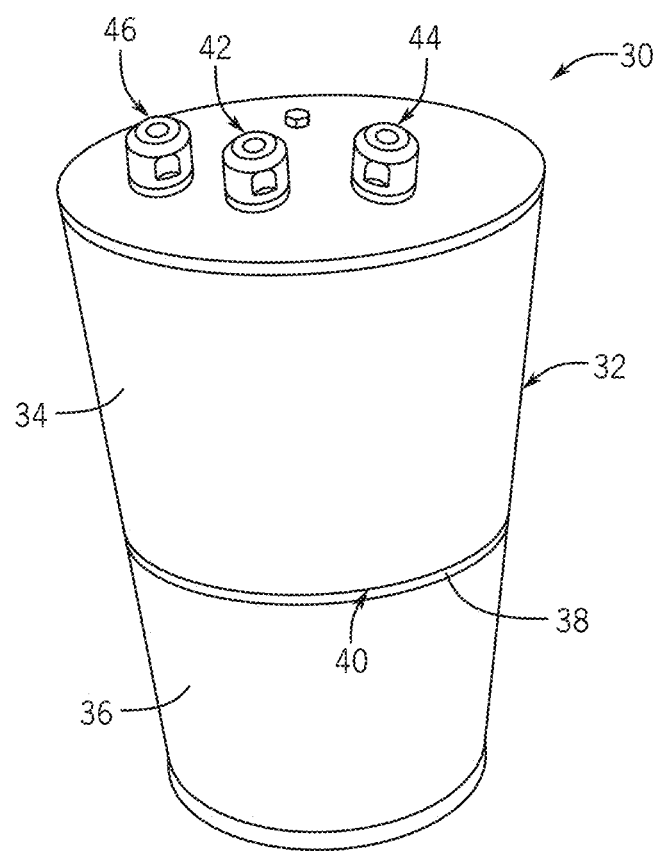
FIG. 3 shows a side and top perspective view of a valve actuator assembly constructed in accordance with the teachings of the present disclosure.
Figure 4:
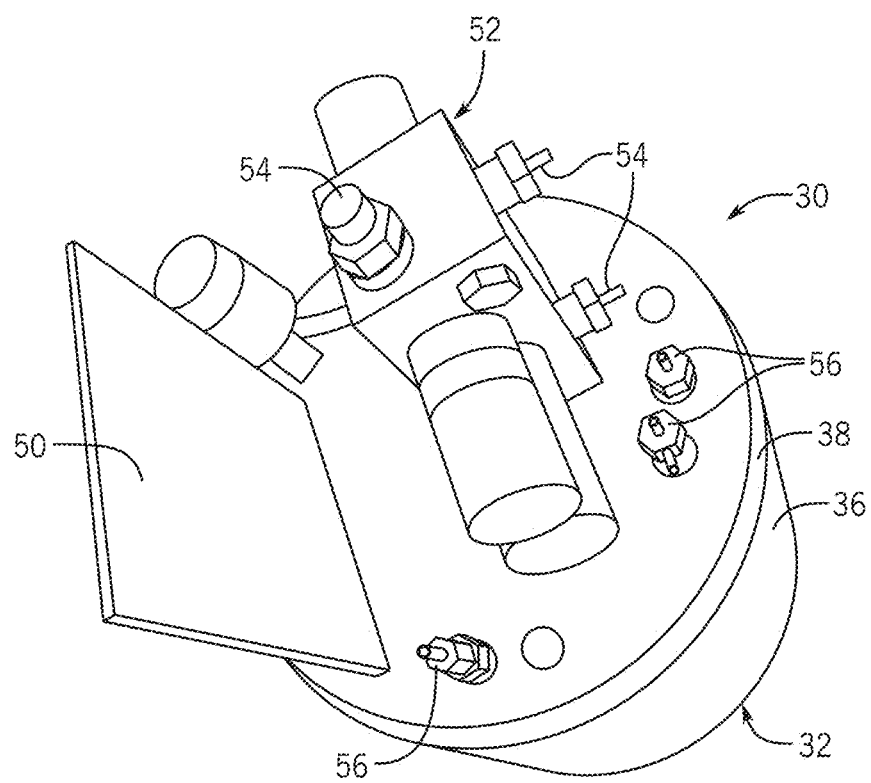
FIG. 4 shows a top perspective view of a bottom half portion of the valve actuator assembly of FIG. 3 and constructed in accordance with the teachings of the present disclosure.
Figure 5:
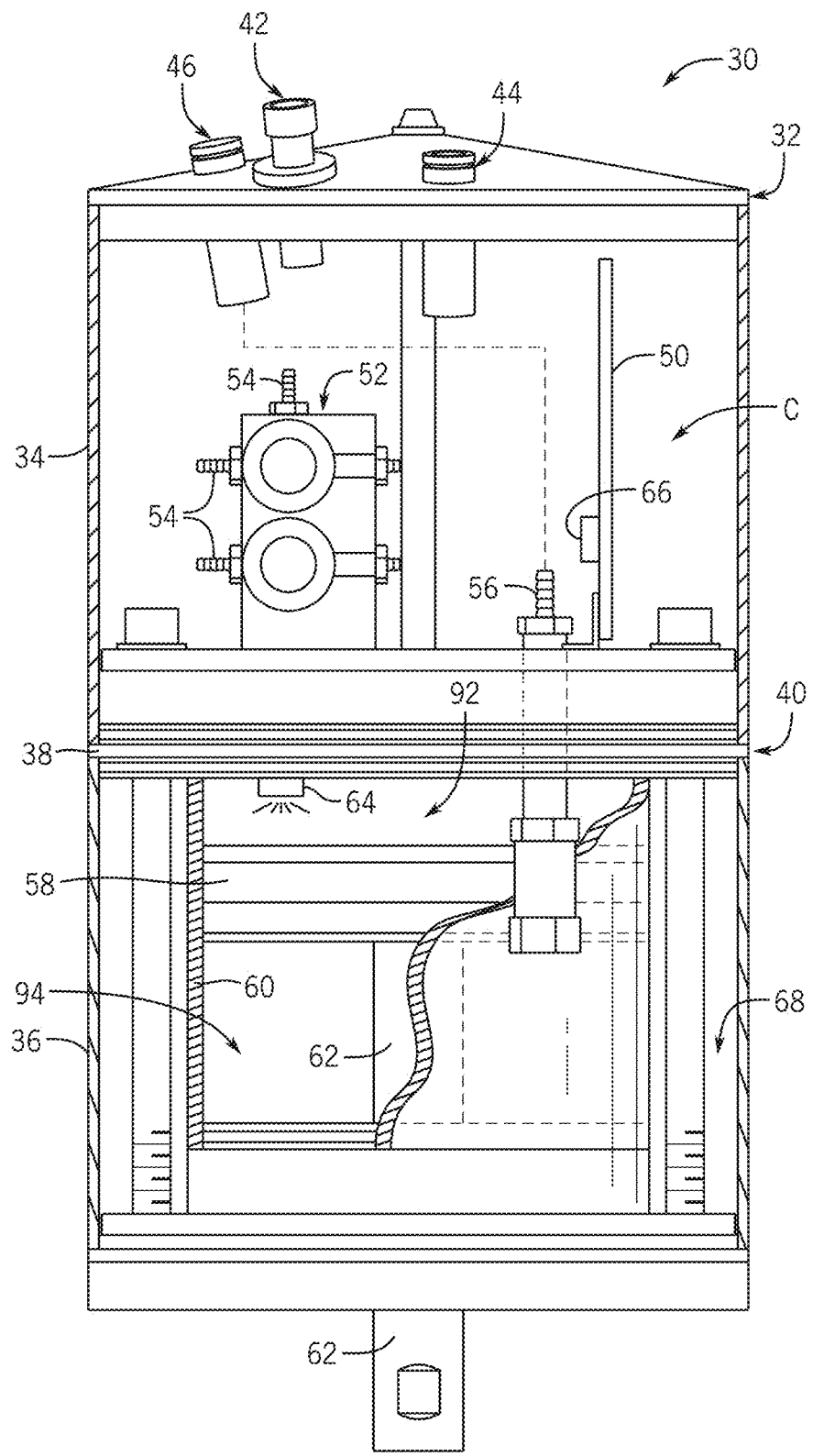
FIG. 5 shows a cross-section of the valve actuator assembly taken along line 5-5 of FIG. 3.

FIGS. 3-5 illustrate the actuator 30, which includes a closed body 32, i.e., a housing, shell, case, or the like, and constructed in accordance with the teachings of the present disclosure. The body 32 may be formed of any suitable material, but in one example can be a stainless steel. The body 32 can also be a substantially entirely sealed unit defining an interior cavity C. The body 32 can have a removable first section, i.e., an upper half 34 and a second section, i.e., a lower half 36 that may be separated from one another (see FIG. 4). The two sections or halves 34, 36 can include a seal 38 (see FIGS. 4 and 5) along a joint 40 between the two halves when assembled. Thus, the sealed body 32 can be configured and assembled to prevent entry of water or other contaminants that might otherwise affect or harm the internal components of the actuator 30. Further, the sealed body 32 can be configured to prevent escape of any substance from the body and can prevent contamination of the surrounding process plant from the actuator 30.

As a result, the actuator 30 may be used in clean room environments, such as the food process industry, and can meet 3A clean room standards. The body 32 may be subjected to pressure washing on a regular basis without harming the surrounding environment and without harm to the internal components of the actuator 30. The actuator body 32 is shown as a cylinder but may have different external housing shapes, as well as a wide range of sizes. However, as discussed further below, the interior cavity C of the body 32 houses a piston (described below) and thus is likely to define a cylindrical shaped piston chamber, i.e., cylinder, as also discussed below. The body 32 thus can define a top, a bottom, and a cylinder shaped side wall extending between the top and bottom. The top of the actuator 30 may include various connectors, such as a first connector, i.e., an electrical connector 42 for connecting wiring to the actuator, as described further below. The top of the actuator 30 may also include a second connector, i.e., a fluid outlet connector 44 for connecting an exhaust line to an exhaust valve inside the actuator, as discussed further below. The top of the actuator 30 may also include a third connector, i.e., a fluid inlet connector 46 for connecting an air inlet or supply line to the actuator, as also described further below.

In other examples, any one or more of the connectors 42, 44, and 46 may be provided on a different surface of the body 32, as desired, instead of on the top of the actuator 30. Also, one or more of the connectors may be a valve instead of a connector coupled to a valve. Further, one or more of the connectors 42, 44, and 46 may be a quick connect type connector for easily being joined to a connector of an exhaust or supply line or to an electrical wire, cable, wiring harness, or mating connector. Still further, additional connectors and other components may also be provided on the body 32 of the actuator 30 for connecting other devices or elements to the actuator, as desired.

FIG. 4 depicts the actuator 30 with the upper half 34 of the body 32 removed and the upper end of the lower half 36 fitted with various components, which are discussed in greater detail below and which are mounted to the lower half to be disposed inside the interior cavity C. Like the connectors 42, 44, and 46, these components can vary in number, type, configuration, and construction according to the needs of a particular process industry application. Further, these components can vary according to the size of the pipe 22 of the process system 20 and the processed material that will be flowing through the pipe. The components can include electronics, sensors, connectors, couplings, flow passages and joints, fasteners, and the like.

In one example as shown in FIGS. 4 and 5, these components in or on the actuator 30 can include multiple components, elements, and features that are provided as a part of the actuator or that are connected thereto, either directly, indirectly, mechanically, electrically, wired, or wirelessly. These components, elements, and features, i.e., aspects, may include an electronic interface in the form of a computer program stored in a memory and operable by a processor. Such a program or interface may communicate with an electronic application, i.e., a phone app, as discussed below. These components, features, aspects, or the like also may include an electronic board, such as a printed circuit board (PCB) 50, within the interior cavity C of the actuator body 32. The PCB 50 may be configured to carry a transmitter and receiver, a transceiver, a processor, a memory, and/or the like.

These components, features, and aspects may also include various mechanical elements and/or electro-mechanical components. As shown in FIGS. 4 and 5, the actuator 30 includes one or more feed/bleed manifolds 52 with feed/bleed valves, such as solenoid valves operable via the electronic components. The manifolds 52 can include fluid connectors 54 for connecting the manifold 52 and the feed/bleed valves thereof to other aspects of the actuator 30, such as to an air supply and to chambers or spaces within the actuator, as described below. The two or more manifolds 52 can be embodied in one component, as represented I FIGS. 4 and 5, instead of as two separate parts. The components, features, and aspects can also include one or more valves and/or connectors 56 for connecting one actuator chamber or space to another, as also described below. The actuator 30 in this example also includes a piston 58 housed and movable within a piston cylinder 60 in the interior cavity C. The piston in this example has a piston rod 62 or actuator rod extending from one side of the piston 58 and protruding from the bottom of the body 32. The solenoid valves of the manifold(s) 52 can be configured to move or direct air to the piston cylinder, as described below, to move the piston and thus the piston rod. The piston 58 and piston rod 62 can include cap seals as is known in the art.

These components, features, and aspects may also include an operating algorithm that is programmed, i.e., tailored for a specific process industry and material, and which may be programmed and applied as a part of the phone app, the processor of the PCB, or both. These components, features, and aspects may also include QVLA® sensing incorporated as a part of the actuator 30 to produce extremely accurate functionality. The QVLA® sensing technology is disclosed and describe in, for example, U.S. Pat. No. 7,388,188 entitled "Apparatus, System and Method for Detecting a Position of a Movable Element in a Compartment" and U.S. Pat. Nos. 8,436,287, 8,115,185, 7,935,916, and 7,626,153, each entitled "System and/or Method for Reading, Measuring and/or Controlling Intensity of Light Emitted from an LED", each of which is incorporated in their entirety herein by this reference. Thus, the actuator 30 can include one or more ultra-stable LED light emitters 64, i.e., QVLA® emitters, and a corresponding one or more light sensors 66. The emitters 64 may be mounted within the piston cylinder 60. The sensors 66 may be mounted to the PCB 50 or to another component of the actuator 30 and may be connected to fiber optic cables (not shown) that extend to the interior of the piston cylinder 60. The emitters 64 emit light into the piston cylinder 60. The intensity of the light changes as the piston 58 moves within the piston cylinder 62. The sensors 66 detect the light intensity through the fiber optic cables. The light intensity and the delta or change in light intensity can be converted and used to determine the instantaneous position of the piston 58, piston rod 62, or both. The sensing frequency can be on the order of 1,000 Hz, 1,500 HZ, 4,000 HZ, 10,000 HZ, or even greater than 15,000 Hz, depending on the needs of the industrial process involved. The QVLA® sensor technology can handle sensitivity speeds greater than 15,000 Hz. The actuator 30 in this example also includes a sealed fail-safe reservoir 68 surrounding the exterior of the piston cylinder 60 within the interior cavity C of the body 32. The purpose of the fail-safe reservoir 68 is also described below.

Figure 6:
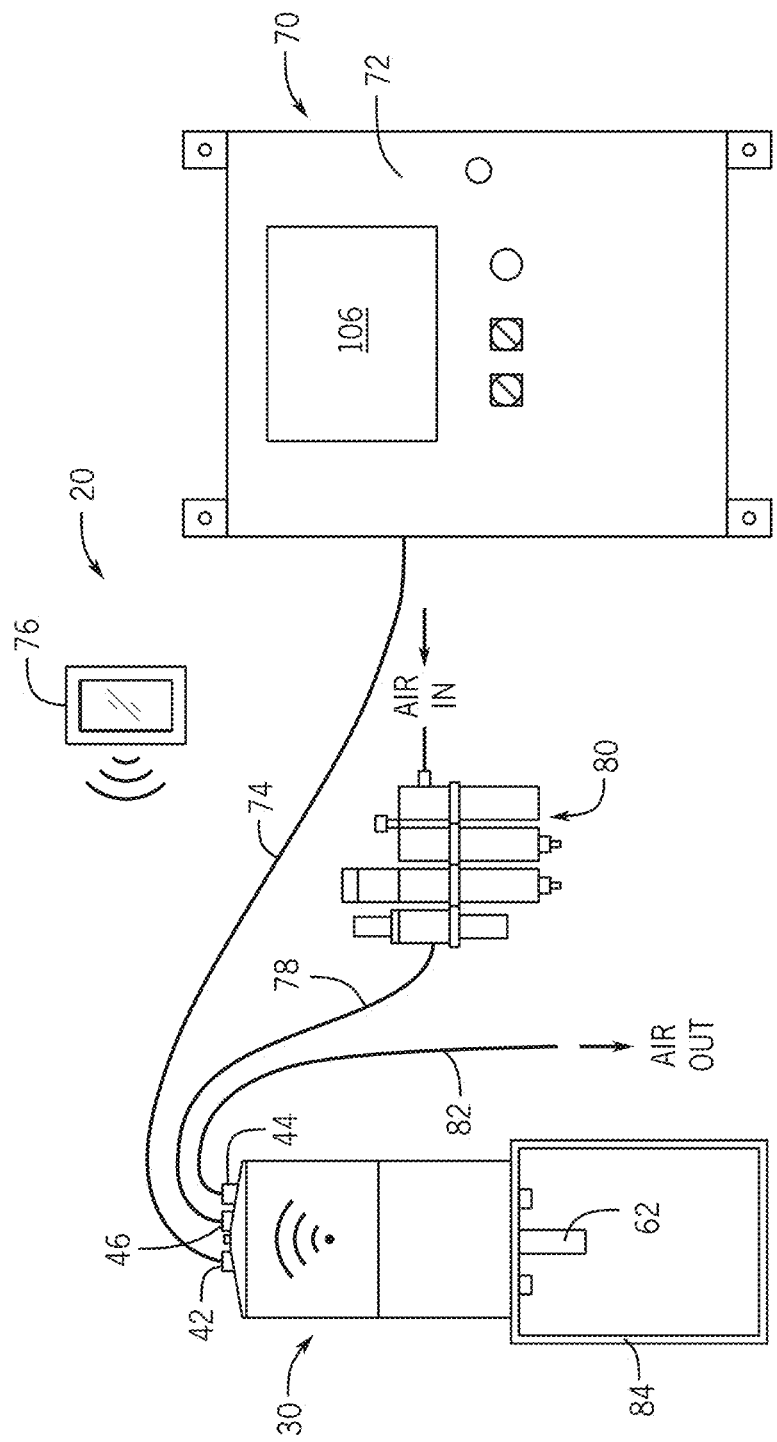
FIG. 6 shows one example of a valve actuator system constructed in accordance with the teachings of the present disclosure and utilizing the valve actuator assembly of FIGS. 3-5.

As noted above and as shown in FIG. 6, the actuator 30 and the valve actuator system 20 can be connected to one or more controllers, such as one or more computers, one or more smart phones, one or more tablet, or the like. FIG. 6 shows the actuator hard wire connected to a controller 70 in the form of a work station, which may include a computer 72. A cable 74 connects the controller 70 to the electrical connector 42 of the actuator 30 and provides power to the actuator. The cable 74 can also provide hard wired communication between the actuator 30 and the controller 70, if desired. FIG. 6 also shows the actuator 30 wirelessly connected to a smart phone 76, tablet, or the like. The communication connection between the actuator 30 and the controller 70 can be wired, wireless, or both, as desired. The communication between the smart phone 76 or table can be wireless by any known or to be known method or technology.

Also as shown in FIG. 6, the actuator 30 is connected to an air supply or source (not shown). The air in this example is delivered via an air feed line 78 through a filter 80 and to the actuator 30 via the third fluid connector 46, i.e., air IN, on the actuator body. The actuator 30 in this example also has an exhaust valve, i.e., a check valve or regulator valve, coupled with the second fluid connector 44, i.e., air OUT, and the second connector may be connected to an exhaust air line 82 that can be routed to a desired location to disperse air exhausted from the actuator 30.

Figure 7:
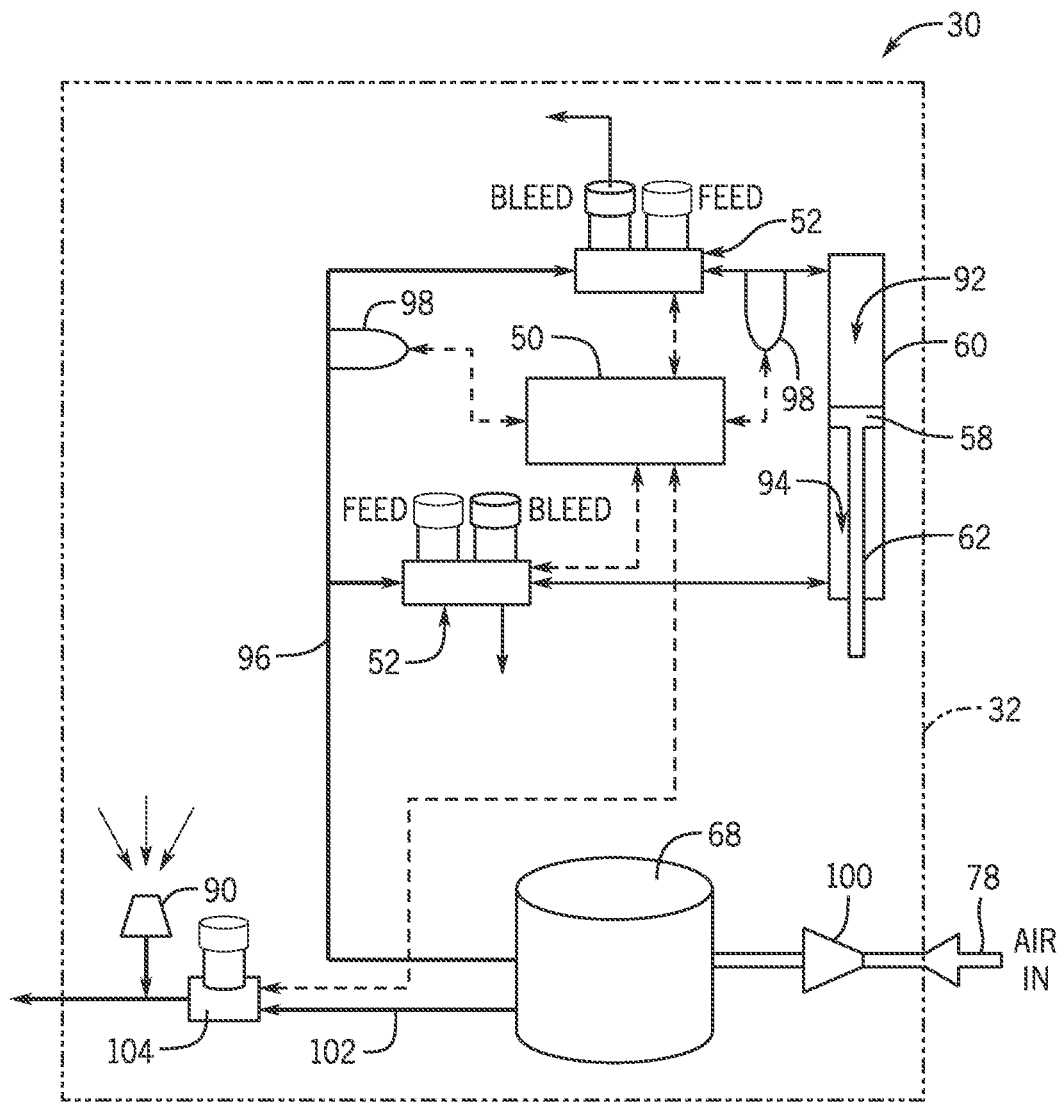
FIG. 7 shows a simplified schematic of one example of a valve actuator assembly constructed in accordance with the teachings of the present disclosure.
Figure 8:
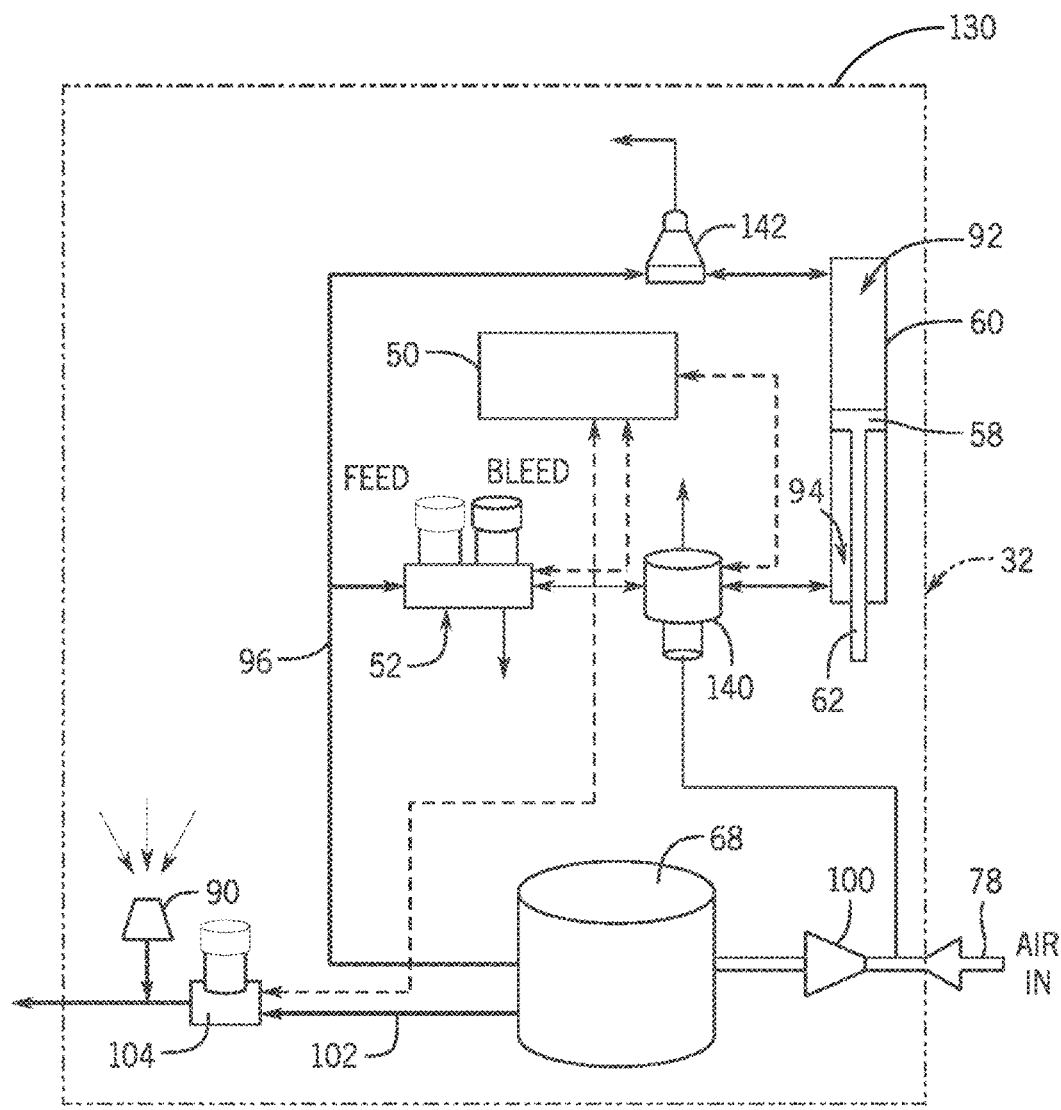
FIG. 8 shows a simplified schematic of another example of a valve actuator assembly constructed in accordance with the teachings of the present disclosure.

As shown in FIG. 2, the actuator 30 can be mounted to a bracket 84, which can then be connected to a water or steam heater, i.e., the steam control valve 28. The exposed or free end of the piston rod 62 can be coupled to the steam control valve in a manner sufficient to operate the valve between an open or full open condition and a closed condition. The steam control valve 28 is operated according to the movement of the piston rod 62, which is controlled by movement of the piston 58, which is further controlled by air pressure as described below. FIGS. 7 and 8 show two schematics of many possible examples for the component arrangement of the actuator 30 according to the teachings of the present disclosure. The functionality of the actuator 30 and the system 20 (shown via FIGS. 2 and 6, for example), and the method of operation are described with reference to FIG. 7 for one example and with reference to FIG. 8 for one alternative example.

Electronics and Electronic Board

As shown in FIG. 7, the system may include electronics, including the PCB 50, which may be a mother board, provided as a part of the system 20. In one example, the PCB 50 may be provided as a part of the actuator 30 and may include a processor and a suitable memory. In one example, the electronics may be configured to communicate with a user's smart phone or other such device, as noted above, through the aforementioned app, which is also discussed in more detail below. The PCB 50, i.e., the mother board, or a daughter board, as noted below, may include Bluetooth communication capability. The system 20 and the actuator 30 may be powered by direct connection to a local power supply through hard wire connections, such as the aforementioned cable 74. The electronics may also include a battery back-up system (not shown). The electronics may also include a real time clock (not shown) that is synced with the components of the system 20. Thus, collected data, failures, system operations, start-up, shut down, and the like can be precisely monitored and controlled.

The electronics may also include pressure sensing capability for the valve actuator and other parts of the system. In one example, the pressure sensing capability may include pressure sensors (not shown) connected to the PCB 50 or mother board and the processor. The pressure sensors can be used to determine the real time pressure in the piston cylinder 60 on both sides of the piston 58. The system 20 may also include pressure sensors to measure air pressure or steam pressure elsewhere in the system 20, as desired.

As noted below, the electronics or PCB 50 can also include a slot (not shown) for a memory card, such as an SD card to be added to the system 20. The electronics may also include a voltage regulator (not shown) to control the voltage applied across the components of the system 20. Also as mentioned above, the electronics may include one or more daughter boards (not shown) coupled to the mother board or PCB 50 to add functionality to the actuator 30 and the system 20, as needed. In one example, the daughter boards or additional PCB's may provide Wi-Fi capability and/or IO-Link capability, which can link various actuators, solenoids, and sensors of the system 20, as desired. Also, the mother board or PCB 50 may include a connection for connecting a USB or other electronic cable, as noted above. Further, the electronics may include a programming port (not shown) accessible either from the exterior of the body 32 or when the electronics are exposed by disassembling the body 32 as in FIG. 4. The programming port may be used to connect to and program the processor or microchip of the electronics, as needed or desired.

The electronics may employ an analog-to-digital (A/D) converter (not shown) to convert analog signals, such as sound and vibration, obtained by portions or components of the system 20 to digital signals for data collection. Likewise, the electronics may employ a digital-to-analog (DAC) converter (not shown) for converting digital signals to analog audio signals for amplification or another purpose.

The electronics may also include the applicant's QVLA® light emitting diode (LED), i.e., the emitters 64, and QVLA® sensing technology, i.e., the sensors 66. The QVLA® technology, including one or more of the emitters 64 and sensors 66, can be applied to the piston 58 to precisely and constantly determine the position of the piston and piston rod 62 to extremely accurately control the position of the steam control valve 28. In comparison to the existing diaphragm actuator 18 technology of FIG. 1, the QVLA® technology applied to the disclosed actuator 30 and system 20 can produce controlled temperature variations of 1° F. or less and can result in heating the processed material in the pipeline to the desired temperature in as little as 15 seconds.

The QVLA® component (LEDs or emitters 64 and detectors or sensors 66) can be connected within and throughout the system with fiber optics (not shown). Plastic fiber optic holders may be sandwiched between two electronic boards or PCB's that are then held in place with screws. The distance between the ends of the fiber optic elements and the detectors or sensors 66 and the LEDs or emitters 64 is critical. This can permit a much less expensive set-up versus a standard hook-up with metal connectors, such as ST connectors. Also, plastic fiber optic components are much easier to use than glass fiber optics, with little to no decrease in performance.

The electronics may include vibration sensors (not shown), such as on the mother board or PCB 50, or on the physical body 32 of the actuator 30 itself, for detecting vibrations in all three axes, i.e., an X-, Y-, and Z-axis of the actuator. The electronics may also include wire trap connectors (not shown) for adding transistors to operate the various solenoid valves, regulator valves, and the like. The electronics can incorporate higher-end transistors that can switch fast enough to enable pulse-width modulation (PWM). The electronics may operate under normal circumstances at between about 4-20 mA for both input and output reporting. The electronics may also be configured to monitor and store voltage data and to include reporting capability regarding system voltage.

The electronics may also be configured to provide digital output of the piston 58 and thus piston rod 62 position either wirelessly, through a USB connection, or both as a precaution. Further, all data regarding the operation parameters of the actuator 30 and system 20 may be reported wirelessly, through a USB connection, or both as a precaution. The system 20 may also incorporate reverse hook-up protection using reverse polarity technology to stop the passage of current if a part of the system is connected improperly. This can protect the integrity of the system 20 components from damage or failure in the event of an incorrect connection, a short circuit, or the like.

As noted above, the system 20 may utilize security technology to limit access to the system controls, data, and/or the like. In one example, a Gauss sensor may be used to establish security. For example, the actuator 30 or the system 20 may be configured to only enter the communication mode, such as via Bluetooth, if a magnetic field is sensed. The magnetic field may be created when a user, with the appropriate magnetic element, positions the element adjacent a corresponding sensor of the system. The type and variety of the magnetic field can also be specified to provide the desired level of security.

Mechanicals

The actuator 30 of the disclosure includes the above-described body 32 as well as the electronic components described above. The actuator 30 may also utilize high cycle, small solenoid valves in the one or more manifolds 52 for directing pneumatic air throughout the system 20, as described in more detail below. Such solenoid valves may also be selected or configured to provide longer operating times at higher temperatures. However, lower temperature requirements can permit using proportional valving, depending on use.

Further, cap seals (not shown) for the piston 58 and piston rod 62 can be utilized to prevent sticking and jerky motion and to increase operational life of the piston and render the piston suitable for higher temperature limits. Use of such a piston 58 and piston rod 62 design, which is more compact and lighter in weight, can reduce the weight and size requirements in comparison to the known diaphragm actuators 18 of comparable performance.

The body 32 of the disclosed actuator 30 can be configured to meet high sanitary standards and meet various sanitary restrictions, such as meeting the 3A cleanliness standards noted above. An actuator 30 that meets the 3A standard must be capable of shedding water no matter the mounting angle or orientation of the actuator during use. The body 32 can utilize special designed seals at the junction between the two body sections or halves 34, 36 and at the various connection ports to meet the 3A standards.

For some process industry environments, the actuator 30 need not meet such stringent performance standards, such as the 3A requirements. In such cases, the body 32 may instead be made from aluminum or composite materials, use conventional or standard seals and sealing techniques, and incorporate lesser quality connectors and connections. The above noted piston cap seals may be utilized for smooth operation. However, in some process industries, such cap seals may not be necessary. The piston rod bearing (not shown) through the bottom of the body 32 may be a high-end custom design with superior materials, such as highly durable composite materials, or may be made from other standard materials. Likewise, the piston 58 and/or the piston rod 62 may be made from high-end, highly durable, lightweight materials, such as a composite, when desired or necessary, or can be made from less expensive standard materials.

The piston rod 62 may also be provided with a thermal break (not shown) along its length providing a point of low thermal conductivity. The break may prevent excess heat from the active or working end of the piston rod being transmitted through sensitive seals or other parts of the piston assembly. The piston rod bearing may be a removable, replaceable, and/or repairable component, which may extend the life of the remainder of the actuator 30 and/or the piston components. The actuator 30 may incorporate high temperature seals, when desired or necessary, or may be fabricated with less expensive seals when suitable. The piston 58 may include a ring or bearing that is also a higher end, highly durable component, such as a composite bearing, or may utilize a more conventional or standard component when suitable.

The system 20 and the actuator 30 may include a purge valve 90 that allows air to escape the fail-safe air reservoir 68, as described in more detail below. The purge valve 90 or klunk valve may use a gravity "clunk" weight to ensure that the valve body is always at the bottom in order to function properly, regardless of the mounting position or orientation of the actuator 30 and fail-safe reservoir 68.

The actuator 30 and system 20 may incorporate tamper resistant fasteners to prevent unwanted removal of the fasteners and to secure the body in the assembled condition. The actuator 30 may include through holes for pneumatic in and out connections, i.e., the connectors 44 and 46, and may include electrical connections, i.e., the connector 42, that all meet 3A cleanliness requirements. The actuator 30 and system 20 may instead include more standard, less expensive electrical connections, where and when suitable, as noted above.

The internal cavity C of the actuator 30 within the removable upper half 34 of the body can be pressurized to maintain a desired pressure, such as 2 psi. The pressurized volume may hold the electronics and valves and thus aid in resisting environmental conditions or contaminants from pressure washing from entering the interior cavity C of the body.

The actuator 30 may also be provided with mounting hole patterns of various sizes and arrangement on a bottom cap or on an adapter plate (not shown) coupled to the body 32. The actuator 30 may be provided in a range of different piston cylinder 60 bore sizes, different stroke lengths, different piston chamber volumes, or the like. The piston 58 and piston rod 62 may be provided in various piston rod diameters, rod lengths, piston diameters, piston heights or axial lengths, and the like. These parameters can be designed to provide an actuator 30 having desired performance characteristics to meet the requirements of a given application.

Operating Algorithm

The operating algorithm of the disclosed actuator 30 and system 20 may be built around a standard feed and bleed concept, with exceptions implemented during abnormal operations. As discussed in greater detail below, and as depicted in FIGS. 5-7, a separate feed and bleed manifold 52 may be connected to each side of the piston 58. One side of the piston 58, i.e., a first side or a first chamber 92 of two piston chambers within the piston cylinder 60, may be maintained or held at a constant pressure. The other side of the piston 58, i.e., a second side or a second chamber 94 of the two piston chambers, may be modulated to hold or obtain the desired position of the piston and thus the piston rod 62, which is connected to the steam control valve 28. When it is desired to move the piston rod 62, the air pressure on the second side of the piston 58 in the second chamber 94 is modulated higher or lower than the static pressure on the first side of the piston in the first chamber 92. The algorithm may be programmed to determine the necessary correlation between pressure and rod movement.

As shown in FIG. 7, the fail-safe reservoir 68 can be coupled to the air supply line or feed line 78. The manifolds 52 can each be coupled to the fail-safe reservoir 68 to receive pressurized air from the reservoir via a feed line 96. Air pressure sensors 98 can be coupled to the feed line 96 at desired locations to detect pressure in the lines and/or in the respective piston chambers 92, 94. Each pressure sensor 98 can each be coupled to the PCB 50 or mother board so that real time pressure is monitored by the system in order to maintain desired operation of the piston 58 and piston rod 62, and thus the steam control valve 28 Each of the solenoid bleed valves of the manifolds 52 can be configured to exhaust air either to the interior cavity C, to be exhausted out via the regulator valve and exhaust line 82, or can be configured to exhaust air directly to the exhaust line or the exterior of the body 32. The manifolds 52 are controlled by the electronics to achieve a desired pressure in each of the piston chambers 92, 94 during operation.

In some instances, an abnormal delay in rod movement may occur, such as when the piston 58 is "stuck." With too long of a delay in rod movement, the pressure on one or both sides of the piston 58 in one or both of the chambers 92, 94 can be varied utilizing the feed and bleed valves of the two manifolds 52 to overcome the stuck situation. In one example, the operating algorithm may be programmed to automatically alter the pressures to alleviate the stuck piston situation. The algorithm may also be programmed to note data in an abnormal look-up table, such as the date, time, pressures, and other pertinent information. Such data may be stored or recorded in the memory, such as the above-noted SD card, and noted for a next Bluetooth communication.

QVLA® Sensing

As noted above, the applicant has developed, patented, and implemented QVLA® sensing devices and techniques. Such QVLA® sensing may be utilized in the disclosed actuator 30 and system 20 to vastly improve performance over the existing, comparable diaphragm actuators. The QVLA® light sensor is faster, more precise, and immune to vibration. Also, no magnets are required for operation. The QVLA® sensing devices and techniques may be improved or altered to accommodate the disclosed actuators, systems, and methods.

In one example, a feedback stabilized light source, i.e., an emitter 64, may be modulated, in software, to create multiple repeatable gains in light output that remain stabilized and that extend the range of the QVLA® technology.

The QVLA® system uses a stabilized light source or emitter 64 to determine distance or volume. The brighter the light source, the longer the distance or greater the volume that can be accurately measured. A current limitation of the existing QVLA® systems is the brightness when placed by a close object. If the light is too bright, the light sensor may become saturated, which may cause multiple duplicate readings while an object is moving away from the sensor, until the light brightness decreases with distance and the light sensor is no longer saturated. The disclosed method overcomes this limitation in the QVLA® technology by incorporating a software algorithm that modulates the QVLA® light.

In the disclosed example, the operating algorithm utilizes two or more levels of QVLA® regulated light that is created by modulating a digital potentiometer to a specific frequency. The algorithm uses this specific frequency as a waiting period to give the QVLA® light emitter 64 time to stabilize before taking a light level reading from the light sensor 66. When setting the modulated QVLA® light levels, the first QVLA® level can be set to just below the saturation point of the light sensor 66 when an object, such as the piston 58, is as close as it will come to the light source or emitter 64. This level will insure that no light level numbers will be duplicated.

The next QVLA® light levels will then be set to a level where the object, such as the piston 58, is moved to a point where the previous light level begins to lose resolution or brightness. The light sensor 66 drops just below saturation for the new QVLA® light level. The operating algorithm is configured to loop through these levels and after each pass of reading the light levels at the different intensities, the algorithm will add together, per the below equation, all the readings and yield a QVLA® number for the distance of the object, i.e., the piston 58, from the light source or emitter 64.

$$QVLA® \text{ number} = QVLA® [1] + QVLA® [2] + QVLA® [\ldots] + QVLA® [n]$$

Using the above-described approach to extend the QVLA® distance has proven to work successfully and is unique to the regulated QVLA® light sensor technology.

In another example, multiple light sensors or emitters 64 may be used and set to different gains to achieve a similar effect, but at a higher hardware cost. For example, a first QVLA® emitter may be associated with the first piston chamber within the piston cylinder and a second QVLA® emitter may be associated with the second piston chamber within the piston cylinder. Likewise, a first QVLA® sensor may be positioned or coupled with the first piston chamber to sense or detect illumination generated by the first QVLA® emitter and a second QVLA® sensor may be positioned to detect or sense illumination generated by the second QVLA® emitter. Further, each piston chamber may include two or more QVLA® emitters and sensors, if desired. Also, QVLA® sensing technology need not be utilized with the actuator and system disclosed and described herein. Other types of sensors and position sensing and monitoring may be used instead, though the advantages obtained through the QVLA® technology would be lost.

Operation

With further reference to FIG. 7, operation of one example of the actuator 30 and system 20, including the fail-safe reservoir 68, is described. In this example, the free end of the piston rod 62 is connected to the steam control valve (FIG. 2). The piston 58 and piston cylinder 60 are provided as a part of the actuator body 32 of FIGS. 3-5. Each side of the piston includes one of the piston chambers 92, 94 within the piston cylinder 60. Each chamber is in pneumatic fluid (air) communication with one of the feed/bleed manifolds 52, each of which includes the solenoid valves for controlling the flow of fluid/air through the valves and thus to and from the piston chambers 92 and 94. Each of the solenoid valves of the manifolds 52 may be controlled by a controller or processor (not shown) on the mother board or PCB 50 of the electronics. Again, the pressure sensors 98 may be provided at desired locations along the system 20 to monitor and control the pressure. In FIG. 7, a pressure sensor 96 is provided on each side of the feed/bleed manifold 52 in communication with the first piston chamber 92, which may be the constant or static pressure chamber.

The actuator system 20 also includes the fail-safe air reservoir 68 from which the system 20 draws the pneumatic fluid/air. The reservoir 68 is connected to the piston 58 via both of the feed/bleed manifolds 52. The air inlet or supply line 78 is connected to the fail-safe reservoir 68 through a one-way check valve 100, allowing air to be delivered to the reservoir as needed, but not escape via the inlet. The fail-safe reservoir 68 also has an outlet line 102 coupled to a solenoid valve 104 for controlling the pressure within the reservoir and the system 20 and for venting the reservoir and system, as needed, to atmosphere.

The system also includes a cracking valve or check valve on the body 32 of the actuator 30 and coupled to the exhaust line 82. The cracking valve is a low-pressure valve, i.e., on the order of 1-2 psi. The cracking valve vents to atmosphere and is used to maintain the positive pressure in the interior cavity C of the body that holds the components and electronics of the actuator 30. The bleed valves of the manifolds 52 may continually or sporadically bleed air into the interior cavity C of the body 32 to pressurize the body. This bleed air helps to cool the components and electronics within the body 32 while also creating the positive internal pressure.

In this example, the fail-safe reservoir 68 can provide supply air at a desired minimum pressure, such as 70 PSI, to the actuator system 20. The supply air may be delivered to the actuator 30 at the bottom (not shown) or the top, as shown. The electronics may be configured to sense the air pressure and activate both feed/bleed valves of both manifolds 52. Air from the fail-safe reservoir 68 is delivered to both feed/bleed manifolds 52. The electronics can be configured to maintain the pressure on the first side, i.e., in the first piston chamber 92 (above the piston in FIG. 7) at a predetermined constant pressure. In one example, the constant pressure may be 30 psi. The position of the piston 58 and thus the piston rod 62 is controlled and maintained by either feeding air into or bleeding air from the second side, i.e., the second piston chamber 94 on the rod side of the piston 58. Feeding air into the second piston chamber 94 increases the pressure higher than the constant pressure of the first side or the first chamber 92 and pushes the piston 58 up, thus moving the piston rod 62 up (with reference to FIG. 7). Bleeding air out of the second piston chamber 94 decreases the pressure below the constant pressure of the first piston chamber 92, which pushes the piston 58 and thus the piston rod 94 down. In this way, the piston 58 actuates the steam control valve 28 of FIG. 2.

The fail-safe reservoir 68, which is maintained at a higher pressure than the desired piston chamber pressures, operates to maintain the system pressure within the desired parameters. A loss of air pressure may be sensed by the electronics via one of the pressure sensors 98 along the pipeline 22 or the steam system 26 or the actuator system 20. The electronics may be configured to open the appropriate solenoid feed valve of the corresponding manifold 52 to drive the piston 58 down for a full closure of the steam control valve 28.

The electronics may also be configured to detect a loss of electrical power and to force an action accordingly. For example, a loss of electrical power to the system may automatically close the feed valve of the manifold 52 to the top of the piston, i.e., to the first side or the first piston chamber 92. This valve may be configured to require electrical power to OPEN. The bleed valve of the manifold 52 for the second side or second piston chamber 94 may be configured to open at the same time (to operate like a NO valve).

The electronics may be configured such that a loss of a 4-20 mA signal to the electronics may cause the feed valve of the manifold 52 for the first piston chamber 92 to close and the bleed valve of the other manifold 52 for the second piston chamber 94 to open. This will force the piston 58 and piston rod 62 to move downward (with reference to FIG. 7) from a 35 psi pressure regulated from above.

Thus, the fail-safe reservoir 68 can aid in closing the steam control valve upon a pressure loss in the system, a power loss to the system, or a signal loss tot eh system. Further, the system can be configured to move the piston 58 upward in the fail-safe mode, if desired, simply be y reconfiguring the pressure to the various lines and chambers from the manifolds.

Phone App

The disclosed actuator, system, and method can be employed using a conventional computer 72 set-up with a separate, dedicated controller 70 and display 106 for set-up and control of the actuator, system, and method, as represented in FIG. 6. However, utilizing an app downloaded to a user's smart phone 76, tablet, or other personal electronic device supplements the system functionality, or eliminates the need for these separate components of the system, and simplifies the function and operation of the system. Smart phones and other personal electronic devices are so common today that almost everyone in this type of business has at least one. Use of the app replaces the complexity and cost of making a separate box for a controller 70 and/or having to provide an additional screen or display 106 for set up and control of the system 20. The app can include integrated software that allows communication between the app and the system 20. The app can be used to control and monitor the system 20 and system functions.

The app display may include various logos to identify the app and, if desired, specific app features. The app may provide real time display of various performance characteristics of the system 20. In just one of many possible examples, the app may display information relating to vibration experienced within the actuator 30 and/or the system components. The information displayed may include the vibration characteristics for all three axes, the degree of vibration, and the force or load resulting from the vibration. The app may also display the real time piston 58 position of the actuator 30. The app may also display pressure in each chamber 92, 94 of the piston cylinder 60, as well as the force applied to the piston rod 62 or by the piston rod to the steam control valve 28.

The app may be configured to provide a data logging function. In one example, data logging may be provided via a memory card, such as an SD card, for data analysis purposes, as needed. The data may be accessible directly through the app on the user's smart phone 76 or electronic device from the PCB 50 of the actuator 30.

The app can be configured, i.e., calibrated, to be installed on different sized valve actuators 30 with different sized pistons 58. The app, as well as a given valve actuator 30, can also be configured to be installed with different sized steam control valves 28 with different actuator stroke lengths. The raw data may be stored in the app memory when raw data is calibrated on stroke length. The raw data never changes and may be stored indefinitely to build a database. However, it may be that a steam control valve 28 that only needs half of the available stroke length of the valve actuator 30 needs to have full retracted and full extended positions identified through a set up and calibration technique on the phone app.

The app can be programmed to monitor performance of the system 20 in real time and to emit a warning signal to the user through the smart phone 76 or personal electronic device. The warning signal can be a specific sound selected from the audio options of the phone or device or even a different sound for each type of warning. The warning signal may also be a vibration, a combination of sound and vibration, or the like. The warning signals can be emitted to warn of excessive excursions in a vibration in any axis, excessive stroke length up or down, piston or rod movement that is slower than expected, or the like. The app can also be configured to warn a user of a system pressure loss, a power outage to the system, or a signal loss to the system.

The app on the smart phone 76, tablet, or personal electronic device can be configured to communicate with the valve actuator 30 and system 20 in a number of ways. In one example, the communication may be through wireless communication method, such as Bluetooth communication or the like. Alternatively, the smart phone 76 or personal electronic device may be connectable to the valve actuator or another part of the system via a USB cable or the like.

In one example, the app may include a log-in feature permitting only an authorized user to log into the app and gain access to the system. The log-in feature may require a passcode, a fingerprint ID, a retinal ID, or may be energized by magnet.

In one example, the actuator 30 may include one or more daughter board slots on the PCB 50 or mother board to provide installation access to additional PCB's, i.e., daughter boards. In one example, a daughter board slot may be utilized to receive a PCB that provides access to wi-fi and the app on the smart phone 76, tablet, or personal electronic device.

In one example, the app can be configured to allow full and complete set-up of the actuator 30 and the entire system 20 on the smart phone 76, tablet, or personal electronic device, remote from the system. Further, the app can be configured to allow a user to calibrate the system 20 and the actuator 30 for a specific application, for repairs, or for restarts, as needed. The app can also be configured to control, monitor, and set-up operation of other aspects of the system 20, other than the actuator 30, such as operation of the klunk valve 90. The app may also be configured to allow for and control manual activation or shutdown of the entire system 20 or aspects of the system.

Referring to FIG. 8, another example of an actuator 130 and system 120 is depicted. Unless described below, the system 120 is substantially similar to that described with reference to FIG. 7. In this example, the supply air from the fail-safe reservoir 68 may be provided at a minimum 60 psi pressure to the system via an air feed line 96 at the bottom of the actuator 130. In this example, a pneumatic 3-way valve 140 is provided, which opens an air line between the feed/bleed manifold 52 connected to the second side, i.e., the second piston chamber 94 or rod side of the piston 58 and piston cylinder 60 when air pressure is present. The feed/bleed manifold in this example on the first side of the piston for the first piston chamber 92 is replaced in this example with a relieving regulator valve or check valve 142 and the 3-way valve 140 is disposed between the feed/bleed manifold 52 and the second side of the piston 58.

Air is supplied from the fail-safe reservoir 68 to both the relieving regulator valve 142 and the feed/bleed manifold 52. In this example, 35 psi air is constantly supplied to the top of the piston, i.e., to the first side or first piston chamber 92, causing a consistent downward force applied to the piston 58 and thus the piston rod 62. The position of the piston 58 is controlled and maintained by one of: feeding air into the second side or second piston chamber 94 of the piston cylinder, which pushes the piston up and thus the piston rod 62 up; or bleeding air out of the second side or second piston chamber of the piston cylinder, which enables the 35 psi air to push the piston and piston rod down.

The operation of the fail-safe reservoir 68 again controls safety aspects of the system. A loss of air pressure to the 3-way valve 140 vents the second chamber 94 or rod side to atmosphere. This enables the 35 psi regulated air to push the piston 58 and the piston rod 62 down by using air from the fail-safe volume, otherwise the same as the example of FIG. 7.

A loss of electrical power automatically closes the feed valve of the manifold 52 to the second side or second piston chamber 94. This valve requires electrical power to open. A loss of a 4-20 mA signal to the electronics may cause the same feed valve to close and the bleed valve to open, which will cause the piston 58 and piston rod 62 to be driven down via the 35 psi regulated air from the opposite first side or first piston chamber 92.

In each of the above examples, the fail-safe reservoir provides air pressure to cause the appropriate, desired piston action to take pace should the system fail for some reason. The fail-safe reservoir also provides a substantially constant, regulated source of air pressure, at least for a significant time, even if the main air supply to the reservoir should fail.

Although certain valve actuator assembly, system, and method examples have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:
1. A valve actuator assembly comprising:
a body defining an exterior that is sealed and an interior cavity;
a piston coupled to a piston rod and movable within a piston cylinder provided within the interior cavity of the body;
a first light emitter disposed in a first piston chamber within the piston cylinder;
a first light sensor positioned such that the first light sensor is configured to sense illumination intensity of the light generated by the first light emitter; and
one or more electronic components, including at least one processor, within the interior cavity the one or more electronic components configured to send a signal to a valve of one or more manifolds to move the piston via controlled air pressure and to continuously monitor and/or determine a position of the piston rod relative to the piston cylinder according to signals generated by the first light sensor,
wherein the first light sensor is coupled to the first light emitter via fiber optics,
wherein a portion of the interior cavity is maintained at a positive pressure, such that the portion of the interior cavity is maintained at a pressure above a pressure adjacent the exterior of the body, and
wherein the positive pressure of the portion of the interior cavity resists environmental conditions or contaminants from entering the portion of the interior cavity of the body.

2. The valve actuator assembly of claim 1, wherein the positive pressure is 1-2 psi above the pressure adjacent the exterior of the body.

3. The valve actuator assembly according to claim 1, wherein a fail-safe reservoir is connected to the first piston chamber and the second piston chamber, and wherein the fail-safe reservoir is configured to have a pressure higher than an operating pressure of either of the first piston chamber and the second piston chamber.

4. The valve actuator assembly of claim 3, wherein the fail-safe reservoir provides operating air to the first piston chamber and the second piston chamber.

5. The valve actuator assembly of claim 3, wherein the fail-safe reservoir is provided within the interior cavity of the body.

6. The valve actuator of claim 3, wherein the fail-safe reservoir is provided within the interior cavity and surrounds the piston cylinder.

7. The valve actuator assembly of claim 1, wherein the body is stainless steel.

8. The valve actuator assembly of claim 1, wherein the body is formed having a removable section that can be removed from a second section that carries, and to expose, the piston cylinder and the electronic components.

9. The valve actuator assembly of claim 8, wherein the removable section and the second section are removably joined to one another along a sealed joint, and wherein the body, when assembled, is configured to meet 3A standards for clean room type environments.

10. A valve actuator system comprising:
a valve actuator assembly having a body defining an exterior that is sealed and an interior cavity, and a piston coupled to a piston rod and movable within a piston cylinder provided within the interior cavity, the piston cylinder having a first chamber on a first side of the piston and a second chamber on a second rod side of the piston;
one or more electronic components, including at least one processor, within the interior cavity, the one or more electronic components configured to send a signal to a valve of one or more manifolds to move the piston via controlled air pressure and to continuously monitor and/or determine a position of the piston rod relative to the piston cylinder;
a fail-safe reservoir coupled to a source of air, the fail-safe reservoir connected to both the first chamber and the second chamber to provide operating air thereto; and
a controller configured to communicate with the processor of the one or more electronic components remote from the body and to selectively monitor and control functions of the valve actuator system,
wherein the first chamber is maintained at a constant pressure within the constraints of the system, and wherein the second chamber is varied in pressure to move and/or to hold the position of the piston to place the piston rod at a desired position relative to the piston cylinder,
wherein a portion of the interior cavity is maintained at a positive pressure, such that the portion of the interior cavity is maintained at a pressure above a pressure adjacent the exterior of the body, and
wherein the positive pressure of the portion of the interior cavity resists environmental conditions or contaminants from entering the interior cavity of the body.

11. The valve actuator system of claim 10, further comprising:
a first light emitter disposed in the first chamber within the piston cylinder; and
a first light sensor positioned such that the first light sensor is configured to sense illumination generated by the first light emitter; and
wherein the first light sensor is coupled to the first light emitter via fiber optics.

12. The valve actuator system of claim 11, wherein the one or more electronic components are configured to move the piston and to continuously monitor and/or determine the position of the piston rod relative to the piston cylinder according to signals generated by the first light sensor.

13. The valve actuator system of claim 12, further comprising:
a steam control valve coupled to a source of steam,
wherein the piston rod is coupled to the steam control valve whereby movement of the piston rod operates the steam control valve.

14. The valve control system of claim 13, wherein the steam supply line downstream of the steam control valve is coupled to a pipe that carries a flow of manufactured product, thereby injecting steam into the flow.

15. The valve control system of claim 12, wherein the controller is a smart phone or tablet that communicates wirelessly with the one or more electronic components.

16. The valve control system of claim 12, wherein the controller includes a computer and a display, wherein the controller communicates with the one or more electronic components.

17. A method of controlling a steam control valve of an industrial process, the industrial process including a valve actuator assembly having a body defining an exterior that is sealed and an interior cavity and a piston coupled to a piston rod and movable within a piston cylinder provided within the interior cavity, the piston cylinder having a first chamber on a first side of the piston and a second chamber on a second rod side of the piston, and the piston rod coupled to an actuator of the steam control valve, the method comprising:
moving the piston, via one or more electronic components within the interior cavity, through controlled air pressure, the one or more electronic components including at least one processor configured to control the air pressure;
continuously monitoring and/or determining, via the one or more electronic components, a position of the piston rod relative to the piston cylinder to control operation of the steam control valve;
selectively monitoring and/or controlling, via a controller disposed remote from the valve actuator assembly and configured to communicate with the processor of the one or more electronic components, functions of the valve actuator system; and
providing operating air from an external source of air to both the first chamber and the second chamber via a fail-safe reservoir disposed within the interior cavity of the body,
wherein a portion of the interior cavity is maintained at a positive pressure, such that the portion of the interior cavity is maintained at a pressure above a pressure adjacent the exterior of the body, and
wherein the positive pressure of the portion of the interior cavity resists environmental conditions or contaminants from entering the interior cavity of the body.

* * * * *